United States Patent [19]

Craven

[11] Patent Number: 4,548,423

[45] Date of Patent: Oct. 22, 1985

[54] UNIVERSAL TRAILER HITCH

[76] Inventor: Trevor Craven, 401 Main St., Woodstock, Ontario, Canada, N4S 1T5

[21] Appl. No.: 573,223

[22] Filed: Jan. 23, 1984

[30] Foreign Application Priority Data

Feb. 7, 1983 [CA] Canada .................................. 421047

[51] Int. Cl.⁴ .............................................. B60D 7/00
[52] U.S. Cl. .................................. 280/492; 280/204; 280/292; 403/330
[58] Field of Search ............... 280/204, 292, 492, 493, 280/494; 403/57, 74, 330

[56] References Cited

U.S. PATENT DOCUMENTS

| | | | |
|---|---|---|---|
| 1,934,141 | 10/1933 | Prentice | 280/492 |
| 3,552,775 | 1/1971 | Warner | 280/492 |
| 3,730,557 | 5/1973 | Cox | 280/492 |
| 4,254,966 | 3/1981 | Mitchell | 280/492 |
| 4,353,572 | 10/1982 | McCain | 280/492 |

FOREIGN PATENT DOCUMENTS

| | | | |
|---|---|---|---|
| 8982 | 3/1980 | France | 280/292 |
| 15287 | of 1902 | United Kingdom | 280/204 |

*Primary Examiner*—Joseph F. Peters, Jr.
*Assistant Examiner*—Everett G. Diederiks, Jr.
*Attorney, Agent, or Firm*—Arne I. Fors; Robert F. Delbridge

[57] ABSTRACT

A connecting device is disclosed for joining a trailer to a towing vehicle for substantial horizontal and vertical pivotal movements, as well as longitudinal rotation, of the trailer relative to the towing vehicle. A shaft added to one yoke of a pair of yokes comprising a universal joint is journalled in a block for rotation through 360 degrees. A similar shaft having a stop at its outer end and secured to the other yoke of the universal joint is inserted into a split block which functions as a quick-release clamping device upon closing of the block to secure the shaft. The bearing block preferably is affixed to the tongue or tow bar of the trailer and the split block is secured to the towing vehicle, the connecting device may be reversed end-for-end.

13 Claims, 6 Drawing Figures

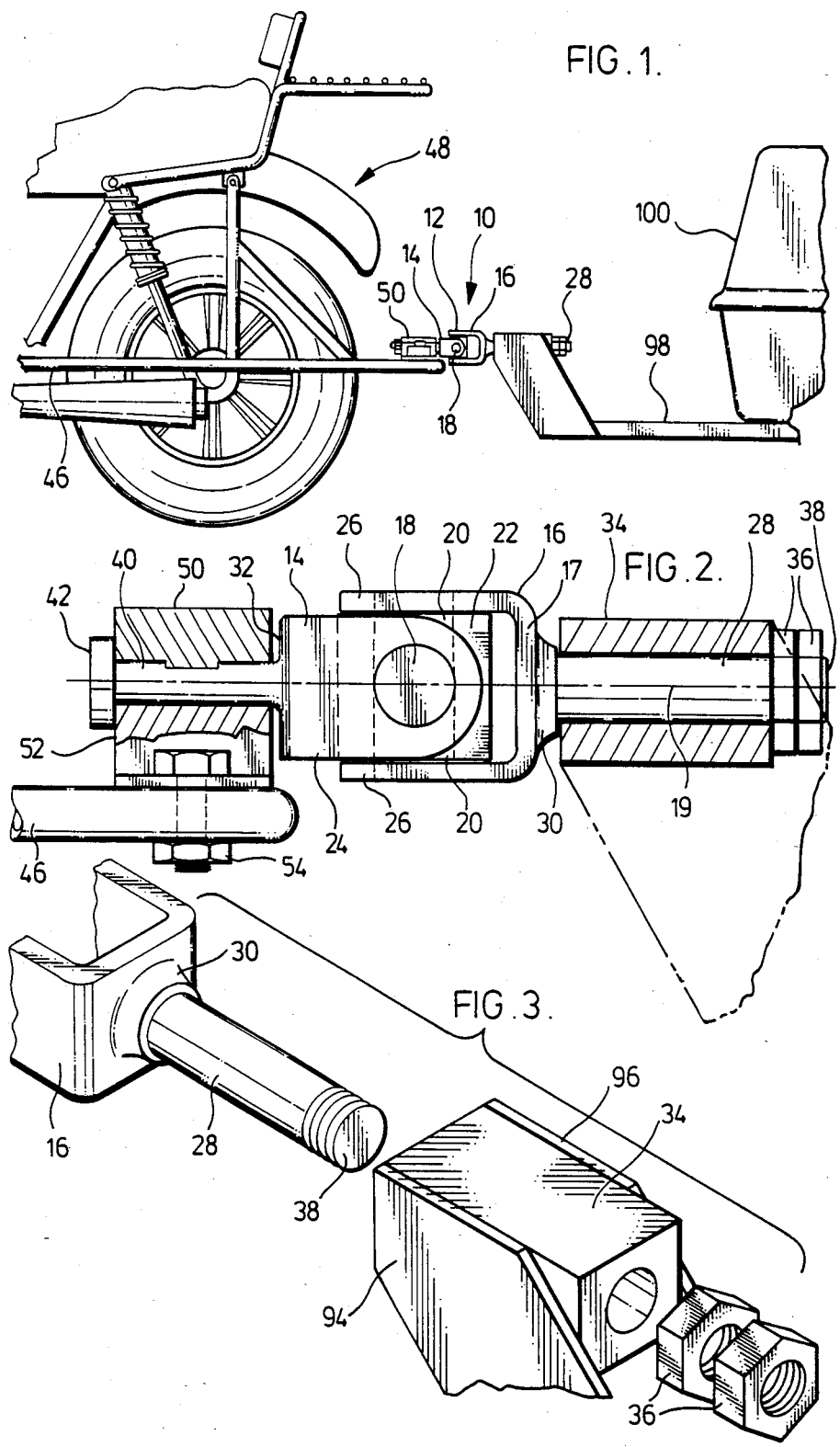

UNIVERSAL TRAILER HITCH

BACKGROUND OF THE INVENTION

This invention relates to trailer hitches for pivotally connecting trailers and the like trailing vehicles to towing vehicles.

Trailer hitches such as coupling devices between automobiles and trailers are well known. Conventional trailer hitches comprise a ball and socket arrangement to provide a coupling between the towing vehicle and the trailer, the coupling essentially permitting relative horizontal movement of the towing vehicle and trailer during driving and parking. Although conventional ball and socket connections permit a large amount of relative angular movement in a horizontal plane, i.e. in turning and parking, between the towing vehicle and the trailer, only a limited amount of relative movement in a vertical plane and essentially no rotation or twisting of the trailer relative to the towing vehicle are permitted.

Load-leveling and load stabilizing trailer hitches are also well known in the prior art. These hitches utilize spring bars or leaf springs of various kinds mounted on or adjacent to a ball hitch. Load-leveling trailer hitches are used to form a bridge across the trailer coupling, thus tending to raise the rear of the towing vehicle and to transfer some of the trailer tongue load to the front of the towing vehicle and to the trailer wheels. Load-stabilizing trailer hitches are used to overcome the tendency of the trailer to sway or rock.

Because of the use of spring bars or other means of spring loading in load-leveling and load-stabilizing trailer hitches, the amount of relative angular movement in a vertical plane between the towing vehicle and the trailer is limited considerably. As a result, the overturning of a trailer often causes the towing vehicle to be overturned as well, resulting in serious damage to the towing vehicle or the trailer tongue or frame and personal injury to occupants or passersby.

The restricted movements allowed by the ball and socket hitch have caused trailers to become separated from the towing vehicles creating uncontrollable hazards.

The present invention permits the continued use of load-leveling and load-stabilization devices and combines with such devices the added features of permitting a trailer to completely rotate on a longitudinal axis through 360 degrees with relatively free pivotal movement in the vertical plane. The utilization of this invention substantially eliminates the separation of an overtuned trailer from a towing vehicle. A motorcyclist riding a motorcycle and pulling a conventional two-wheeled trailer coupled together by the hitch of the present invention is able to lean his or her bike into tight turns unrestricted by the inability of the trailer to bank.

STATEMENT OF INVENTION

The present invention in a broad aspect comprises a trailer hitch for detachably connecting a trailer to a towing vehicle including, in combination: a universal joint having a pair of pivotally interconnected yokes, each yoke having a longitudinal axis and mounted for pivotal movement about a transverse axis, a shaft secured to one yoke in axial alignment with its longitudinal axis, a bearing block journalled on said shaft, means for restraining said shaft from axial separation from said bearing block, a shaft secured to the other yoke in axial alignment with its longitudinal axis, said shaft having an annular shoulder or stop formed thereon, a connector adapted to rigidly receive said second shaft for releasable engagement, said connector having means for locking said second shaft in the connector, means for connecting one of said bearing block and said connector to the towing vehicle and means for connecting the other of said bearing block and connector to the trailer whereby said trailer is free to pivot horizontally and vertically relative to the towing vehicle and is free to rotate relative to said towing vehicle.

The connector preferably is connected to the trailing vehicle and comprises a base having means for securement to the trailing vehicle. A longitudinal groove formed in the base is adapted to receive the second shaft and a closure member pivotally mounted on the base co-operates with the base and the annular shoulder formed on the second shaft to secure the shaft in said connector. A keyway formed on the shaft is adapted to receive a mating key formed in the closure member to prevent rotational movement of said second shaft within the connector when closed. At least one threaded hole may be formed in the closure member and adapted to receive a set or jam screw for abutment on and engagement with the second shaft to further eliminate rotation of the shaft.

BRIEF DESCRIPTION OF THE DRAWINGS

The invention will now be described with reference to the accompanying drawings, in which:

FIG. 1 is a side elevation of the trailer hitch of the present invention shown coupling a trailer to a motorcycle;

FIG. 2 is a more detailed side elevation of the trailer hitch illustrated in FIG. 1;

FIG. 3 is an exploded perspective view of a portion of the trailer hitch;

Like reference characters refer to like parts throughout the description of the drawings.

DESCRIPTION OF THE PREFERRED EMBODIMENT

Figure 4:
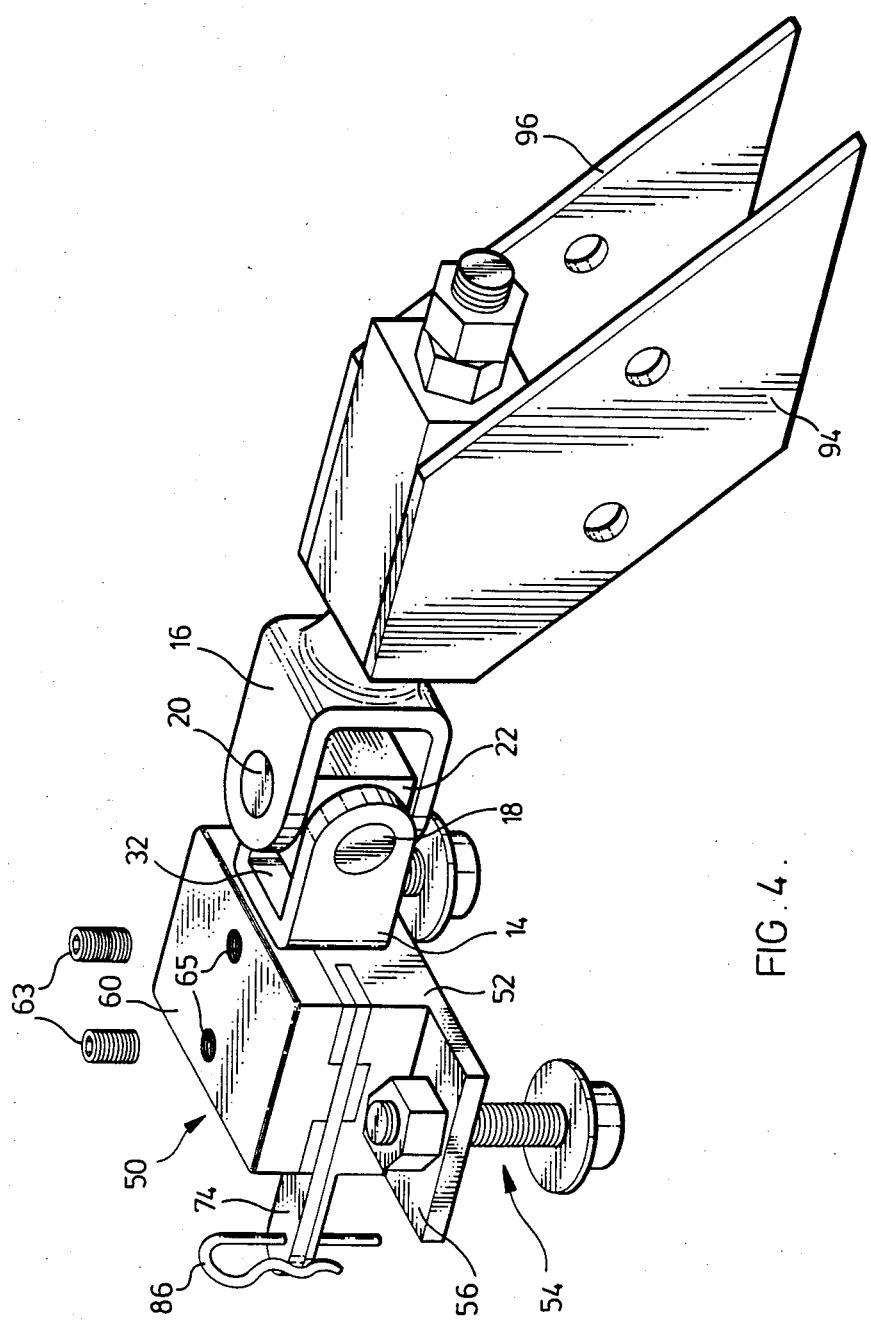
FIG. 4 is an enlarged perspective view of the embodiment of my trailer hitch illustrated in FIG. 1.
Figure 5:
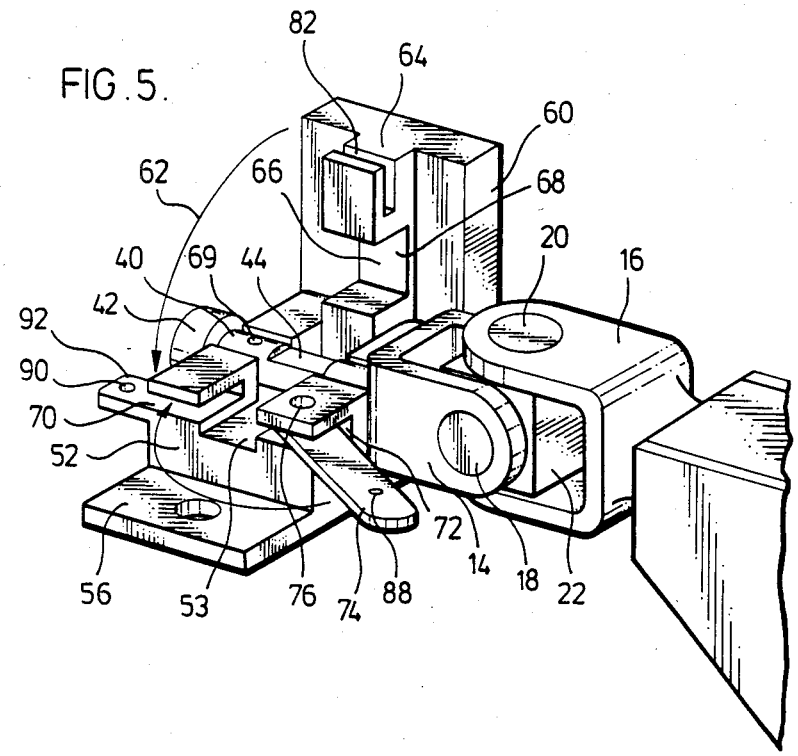
FIG. 5 is a perspective view of the connector of the invention in its opened position.

With reference now to the FIG. 1-6, the trailer hitch of my invention depicted by numeral 10 comprises universal joint consisting of U-shaped yokes 14, 16 pivotally connected together in a conventional manner by means of pairs of pins 18,20 which extend from opposite sides of central block 22 into the spaced-apart arms 24, 26 respectively of yokes 14, 16.

Rearwardly extending shaft 28 is secured to the web 17 of yoke 14 such as by weld 30 for axial alignment with longitudinal axis 19 of yokes 14, 16. Shaft 28 is journalled in bearing block 34 for rotation therein and secured from axial separation by means of lock nuts 36, 37 or the like stop threaded onto end 38 of shaft 28. Bearing block 34 thus is free to rotate through 360 degrees relative to shaft 28 while being restrained from axial separation therefrom by means of locking nuts 36 [,37]; inner nut 36 usually axially adjusted to position block 34 on shaft 28 and outer nut [37] 36 employed to lock inner nut 36 in position.

A second shaft 40 is in like manner secured to the web 32 of yoke 14 by means of a weld for longitudinal alignment with yoke 14. The free end of shaft 40 has an annular shoulder or stop 42 secured thereto or formed by upsetting the end of shaft 40 as shown most clearly in FIG. 2. Shaft 40 has a keyway 44 formed in the central portion thereof for reasons which will become apparent as the description proceeds.

Shaft 40 is normally detachably secured to the chassis or frame 46 of a towing vehicle such as motorcycle 48 by a connector or quick-disconnect device such as split block assembly 50 having a base member 52 secured to frame 46 by nut and bold assemblies 54 which pass through lateral flanges 56 which project outwardly from each side of base member 52.

Base member 52 as illustrated has a longitudinal groove in the shape of a half of a right circular cylinder formed therein to receive the lower half of shaft 40. The upper half or closure member 60 of split block 50 is pivotally mounted on a shaft, not shown, for pivotal movement from the position shown in FIG. 5 downwardly as depicted by arrow 62 into the closed position shown in FIG. 4. A transverse rib 64 having a central recess 66 straddles shaft 40 with the base 68 of recess 66 preferably forming a key adapted to seat into keyway 44 formed in shaft 40. Shaft 40 thus is restricted from rotational movement within split block 50, axial separation of shaft 40 being essentially prevented by annular shoulder or stop 42, when the connector is closed.

Rotation of shaft 40 can be further restricted by the use of one or more set of jam screws 63 threaded into screw holes 65 formed in closure member 60 to intersect shaft 40 and seat on depressions 69, one of which is shown when member 60 is closed.

Base member 52 has a pair of spaced-apart aligned slots 70, 72 straddling groove 53 with a locking or stabilizing lever 74 pivotally mounted in slot 72 by pin 76 for pivotal movement into and out of slot 70. Locking lever 74 is adapted to fit into outwardly facing slot 82 formed in rib 64 such that closure member 60 of split block 50 can be effectively locked to base member 52 as shown in FIG. 4 upon closure of the member 60 by pivoting locking lever 74 into slots 70, 82 and inserting safety pin 86 into matching holes 88, 90 formed in lever 74 and tab 92 respectively.

Although connector 50 and bearing block 34 are shown secured to the towing vehicle 48 and trailer 100, respectively, with bearing block 34 shown to have spaced-apart side plates 94, 96 for securement to the tongue 98 of trailer 100, it will be understood that the connector and bearing block can be reversed end-for-end if desired.

Figure 6:
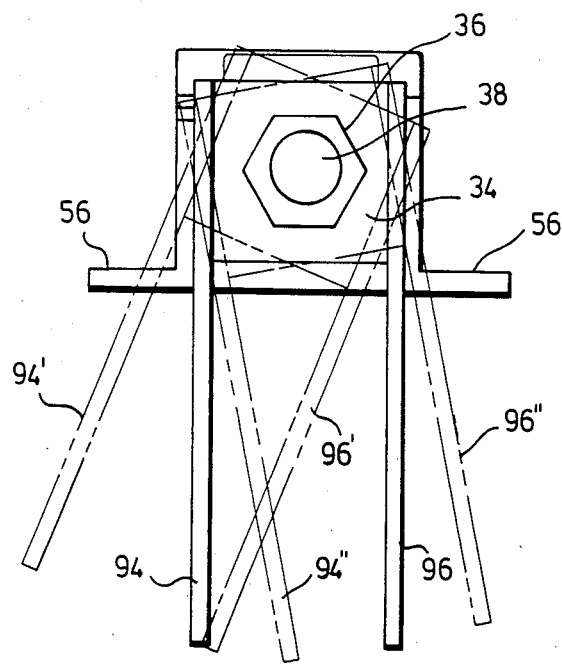
FIG. 6 is an end view of the embodiment of the trailer hitch shown in FIG. 1 illustrating rotation of the rear component of the trailer hitch relative to the front component.

FIG. 6 illustrates rotational movement of the rear end of the hitch by pivotal movement of side plates 94, 96 to the left, as shown by ghost lines 94', 96' or to the right as shown by ghost lines 94'', 96''.

The present invention provides a number of important advantages. A sturdy and reliable trailer hitch is provided which allows not only horizontal and vertical articulation of a trailer relative to a towing vehicle, but also permits complete rotation of a trailer relative to the towing vehicle. A degree of rotation of a trailer having a convention axle with laterally spaced wheels relative to a motorcycle is necessary when the motorcycle banks during the rounding of turns, especially sharp turns. The tipping of trailers onto their sides, a frequent occurrence, does not result in the normal tipping of the towing vehicle or breaking off of the trailer hitch itself from the towing vehicle with the release and loss of control of a trailer which is possibly travelling at high speeds. The trailer hitch can be quickly and readily detached from the towing vehicle or securely locked in place, as desired.

It will be understood, of course, that modifications can be made in the embodiments of the invention described and illustrated herein without departing from the scope and purview of the invention as defined in the appended claims.

What I claim as new and desire to protect by Letters Patent of the United States is:

1. A trailer hitch for detachably connecting a trailer to a towing vehicle comprising, in combination:
   a universal joint having a pair of pivotally interconnected yokes, each yoke having a longitudinal axis and mounted for pivotal movement about a transverse axis,
   a shaft secured to one yoke in axial alignment with the yoke longitudinal axis,
   a bearing block journalled on said shaft for rotation of the shaft therein,
   means for restraining said shaft from axial separation from said bearing block,
   a second shaft secured to the other yoke in axial alignment with the longitudinal axis of said yoke, said second shaft having a free end and an annular shoulder formed on said free end,
   a connector adapted to receive said second shaft for releasable engagement, said connector comprising a base having a longitudinal groove formed therein for receiving said second shaft, a closure member pivotally mounted on said base adapted to co-operate with the base when closed to rigidly lock the second shaft within the groove of the base of the connector,
   means for connecting one of said bearing block and said connector to the towing vehicle and means for connecting the other of said bearing block and connector to the trailer whereby said trailer is free to pivot horizontally and vertically relative to the towing vehicle and is free to rotate longitudinally relative to said towing vehicle.

2. A trailer hitch as claimed in claim 1 in which the second shaft has a transverse keyway formed thereon, and the closure member has a mating key adapted to be inserted into the keyway to prevent rotational movement of the second shaft within the connector when the connector is closed.

3. A trailer hitch as claimed in claim 1 in which said closure member has at least one threaded hole formed therein and a set screw adapted to be threaded into the hole for abutment on and engagement with the second shaft to prevent rotation of the second shaft within the connector.

4. A trailer hitch as claimed in claim 2 in which said closure member has at least one threaded hole formed therein and a set screw adapted to be threaded into the hole for abutment on and engagement with the second shaft to prevent rotation of the second shaft within the connector.

5. A trailer hitch as claimed in claim 2 in which the annular shoulder on the second shaft is formed integral on the free end thereof for abutment against the connector.

6. A trailer hitch as claimed in claim 6 in which the base has a transverse groove formed therein and the closure member has a mating transverse rib with a central recess adapted to seat in said transverse groove and straddle the second shaft, a slot formed in the transverse rib, and a locking lever pivotally mounted in said base adapted to pivot into and out of said slot for engagement therewith when the cover member is closed for locking said closure member on the base.

7. A trailer hitch as claimed in claim 6 in which the second shaft has a keyway formed thereon and a key is formed on the transverse rib adapted to seat in said keyway to prevent rotation of the second shaft within the connector.

8. A trailer hitch as claimed in claim 12 in which the closure member has at least one threaded hole formed therein and a set screw adapted to be threaded into the hole for abutment on and engagement with the second shaft to prevent rotation of the second shaft within the connector.

9. A trailer hitch as claimed in claim 6 in which a pair of spaced-apart slots are formed in the base in alignment with the slots formed in the rib of the cover member and straddling said rib when said cover member is closed, said locking lever being pivotally mounted within one of said spaced-apart slots for pivotal movement into the other two aligned slots for locking the closure member to the base member.

10. A trailer hitch as claimed in claim 8 in which a pair of spaced-apart slots are formed in the base in alignment with the slots formed in the rib of the cover member and straddling said rib when said cover member is closed, said locking lever being pivotally mounted within one of said spaced-apart slots for pivotal movement into the other two aligned slots for locking the closure member to the base member.

11. A trailer hitch as claimed in claim 6 in which a pair of spaced-apart slots are formed in the base in alignment with the slots formed in the rib of the cover member and straddling said rib when said cover member is closed, said locking lever being pivotally mounted within one of said spaced-apart slots for pivotal movement into the other two aligned slots for locking the closure member to the base member and in which an outwardly projecting tab is formed in the base adapted to overlie the free end of the locking lever when the closure member is locked, each of said tab and locking lever having a hole formed therein adapted to be aligned with each other for receiving a pin when the closure member is closed and locked.

12. A trailer hitch as claimed in claim 7 in which a pair of spaced-apart slots are formed in the base in alignment with the slots formed in the rib of the cover member and straddling said rib when said cover member is closed, said locking lever being pivotally mounted within one of said spaced-apart slots for pivotal movement into the other two aligned slots for locking the closure member to the base member and in which an outwardly projecting tab is formed in the base adapted to overlie the free end of the locking lever when the closure member is locked, each of said tab and locking lever having a hole formed therein adapted to be aligned with each other for receiving a pin when the closure member is closed and locked.

13. A trailer hitch as claimed in claim 8 in which a pair of spaced-apart slots are formed in the base in alignment with the slots formed in the rib of the cover member and straddling said rib when said cover member is closed, said locking lever being pivotally mounted within one of said spaced-apart slots for pivotal movement into the other two aligned slots for locking the closure member to the base member and in which an outwardly projecting tab is formed in the base adapted to overlie the free end of the locking lever when the closure member is locked, each of said tab and locking lever having a hole formed therein adapted to be aligned with each other for receiving a pin when the closure member is closed and locked.

* * * * *